(12) United States Patent
Ahn et al.

(10) Patent No.: US 11,453,406 B2
(45) Date of Patent: Sep. 27, 2022

(54) APPARATUS AND METHOD FOR DETERMINING RIDE COMFORT OF MOBILITY

(71) Applicants: Hyundai Motor Company, Seoul (KR); Kia Motors Corporation, Seoul (KR); Sookmyung Women's University Industry-Academic Cooperation Foundation, Seoul (KR)

(72) Inventors: Sung Min Ahn, Suwon-si (KR); Suh Yeon Dong, Seoul (KR)

(73) Assignees: Hyundai Motor Company, Seoul (KR); Kia Motors Corporation, Seoul (KR); Sookmyung Women's University Industry-Academic Cooperation Foundation, Seoul (KR)

( * ) Notice: Subject to any disclaimer, the term of this patent is extended or adjusted under 35 U.S.C. 154(b) by 83 days.

(21) Appl. No.: 17/023,657

(22) Filed: Sep. 17, 2020

(65) Prior Publication Data

US 2021/0122381 A1 Apr. 29, 2021

(30) Foreign Application Priority Data

Oct. 29, 2019 (KR) .......................... 10-2019-0135833

(51) Int. Cl.
| | |
|---|---|
| *B60W 40/08* | (2012.01) |
| *B60W 50/00* | (2006.01) |
| *B60W 10/30* | (2006.01) |
| *B60W 10/20* | (2006.01) |

(52) U.S. Cl.
CPC ........ *B60W 50/0098* (2013.01); *B60W 10/20* (2013.01); *B60W 10/30* (2013.01); *B60W 40/08* (2013.01); *B60W 2040/0881* (2013.01); *B60W 2540/22* (2013.01); *B60W 2540/221* (2020.02); *B60W 2540/223* (2020.02)

(58) Field of Classification Search
None
See application file for complete search history.

(56) References Cited

U.S. PATENT DOCUMENTS

| | | | | |
|---|---|---|---|---|
| 8,398,546 | B2* | 3/2013 | Pacione ................ | A61B 5/1118 |
| | | | | 128/920 |
| 9,988,055 | B1* | 6/2018 | O'Flaherty ............ | G08B 21/06 |
| 10,525,850 | B1* | 1/2020 | Tang ..................... | B60R 16/037 |
| 10,824,852 | B1* | 11/2020 | Zhang .................. | G06K 9/6256 |
| 10,845,802 | B2* | 11/2020 | Stark .................... | A61B 5/7221 |
| 10,878,787 | B2* | 12/2020 | Hampiholi ............ | B60W 50/14 |
| 10,967,873 | B2* | 4/2021 | Sobhany ............... | B60W 50/12 |

(Continued)

*Primary Examiner* — Jonathan M Dager
(74) *Attorney, Agent, or Firm* — Slater Matsil, LLP

(57) ABSTRACT

An apparatus for determining ride comfort of a passenger using brain wave signals includes an analyzer configured to determine first ride comfort information of a passenger based on information on a seating posture of the passenger in a mobility, a sensor configured to collect brain wave signals of the passenger in the mobility for a predetermined time, and a controller configured to control the mobility, wherein the analyzer is configured to determine second ride comfort information obtained by correcting the first ride comfort information, by analyzing the collected brain wave signals based on the first ride comfort information, and wherein the controller is configured to control the mobility based on the determined second ride comfort information.

20 Claims, 9 Drawing Sheets

(56) References Cited

U.S. PATENT DOCUMENTS

| | | | | |
|---|---|---|---|---|
| 11,001,267 | B2* | 5/2021 | Donnelly | A61B 5/7203 |
| 11,059,349 | B2* | 7/2021 | Prakah-Asante | B60H 1/00807 |
| 11,225,258 | B2* | 1/2022 | Matsunami | B60Q 1/52 |
| 11,230,239 | B2* | 1/2022 | Sobhany | H04L 12/40 |
| 2005/0090757 | A1* | 4/2005 | Kuramori | A61B 5/389 |
| | | | | 600/590 |
| 2008/0214944 | A1* | 9/2008 | Morris | A61B 5/486 |
| | | | | 600/509 |
| 2011/0224875 | A1* | 9/2011 | Cuddihy | B60W 10/18 |
| | | | | 701/1 |
| 2017/0305349 | A1* | 10/2017 | Naboulsi | B60R 1/025 |
| 2017/0311831 | A1* | 11/2017 | Freer | A61B 5/18 |
| 2018/0082501 | A1* | 3/2018 | Kochhar | B60W 40/00 |
| 2018/0174457 | A1* | 6/2018 | Taylor | G08G 1/096741 |
| 2018/0178808 | A1* | 6/2018 | Zhao | B60K 28/066 |
| 2018/0220948 | A1* | 8/2018 | Kojima | G08B 21/06 |
| 2018/0229674 | A1* | 8/2018 | Heinrich | A61B 5/4803 |
| 2018/0264974 | A1* | 9/2018 | Ramachandran | B60N 2/0232 |
| 2018/0364966 | A1* | 12/2018 | Valeri | H04S 7/30 |
| 2019/0049957 | A1* | 2/2019 | Healey | G05D 1/0221 |
| 2019/0073547 | A1* | 3/2019 | el Kaliouby | G06V 20/597 |
| 2019/0102689 | A1* | 4/2019 | Lassoued | G07C 5/008 |
| 2019/0155279 | A1* | 5/2019 | Tayama | B60W 50/14 |
| 2019/0232974 | A1* | 8/2019 | Reiley | G06V 20/597 |
| 2019/0299830 | A1* | 10/2019 | Alequin | B60N 2/56 |
| 2020/0001910 | A1* | 1/2020 | Chow | B62D 1/046 |
| 2020/0039520 | A1* | 2/2020 | Misu | B60W 60/0013 |
| 2020/0073478 | A1* | 3/2020 | An | G06F 3/011 |
| 2020/0207358 | A1* | 7/2020 | Katz | G01C 21/3697 |
| 2020/0223410 | A1* | 7/2020 | Ikezawa | G05D 1/0223 |
| 2020/0242421 | A1* | 7/2020 | Sobhany | G06F 3/011 |
| 2020/0254211 | A1* | 8/2020 | Aoki | B60H 1/00742 |
| 2021/0114599 | A1* | 4/2021 | Kang | A61B 5/165 |
| 2021/0129851 | A1* | 5/2021 | Wieczorek | B60W 30/14 |
| 2021/0179117 | A1* | 6/2021 | Glazman | H04S 7/303 |
| 2021/0291854 | A1* | 9/2021 | Hofmann | B60W 50/16 |
| 2021/0394789 | A1* | 12/2021 | Ji | B60W 40/08 |

* cited by examiner

FIG. 4A
FIG. 4B
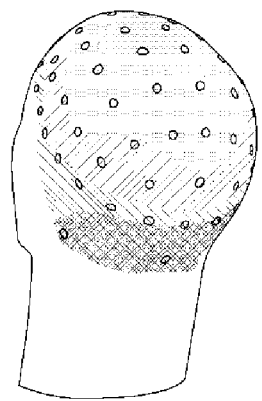
-9.3µV    -0.6µV
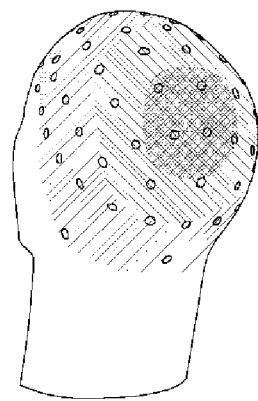
-1.8µV    13.0µV

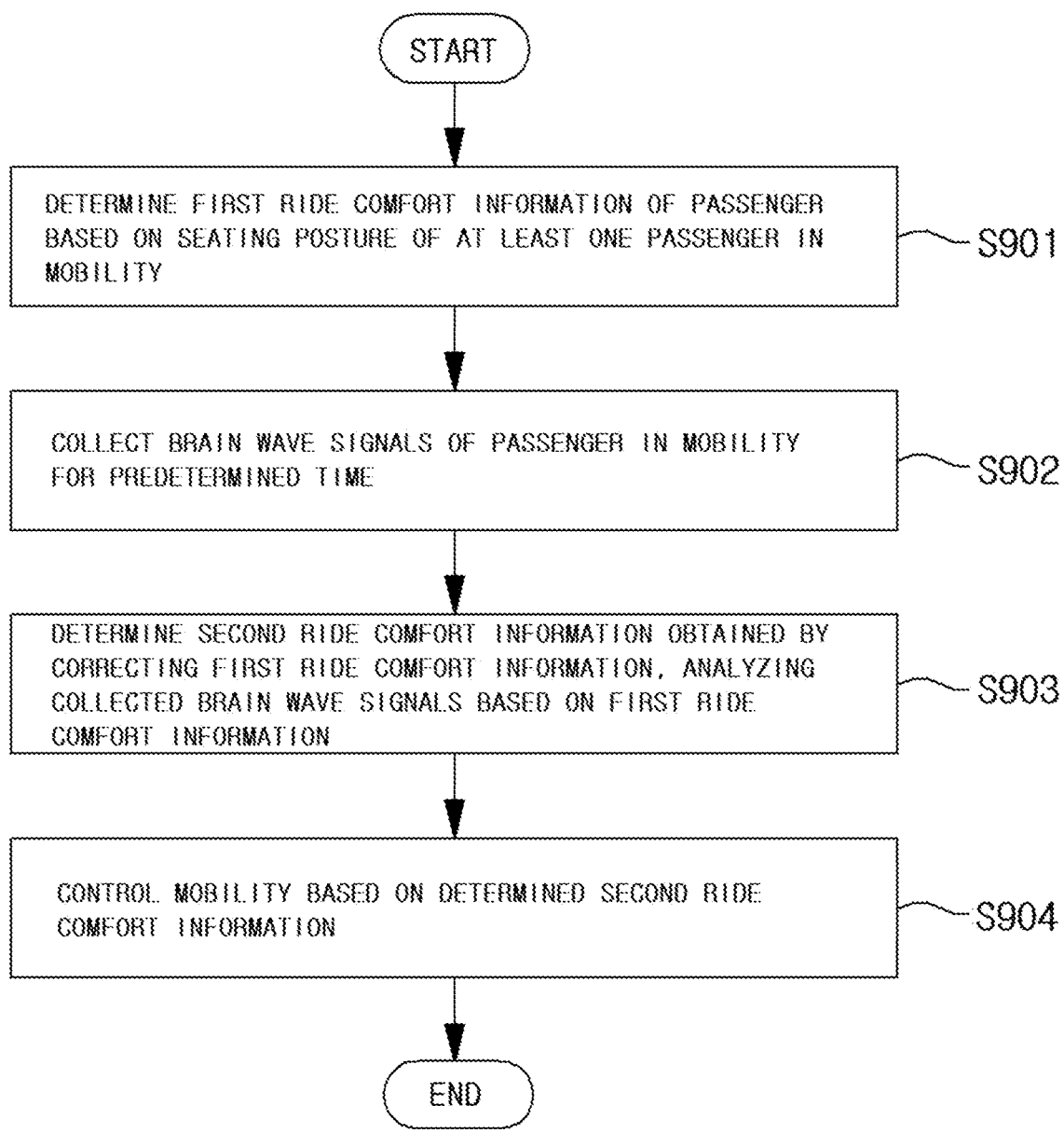

APPARATUS AND METHOD FOR DETERMINING RIDE COMFORT OF MOBILITY

CROSS-REFERENCE TO RELATED APPLICATIONS

This application claims priority to Korean Patent Application No. 10-2019-0135833, filed on Oct. 29, 2019, which application is hereby incorporated herein by reference.

TECHNICAL FIELD

The present disclosure relates to a mobility controlling method and apparatus. More particularly, the present disclosure relates to a mobility controlling method and apparatus for determining the ride comfort of a mobility passenger based on the brain wave signal of the mobility passenger.

BACKGROUND

The statements in this section merely provide background information related to the present disclosure and may not constitute prior art.

As one of the transport means, a vehicle (or mobility) is a very important means and tool for living a life in the modern world. Furthermore, a mobility itself may be regarded as something special that gives meaning to someone.

As technology is advanced, functions provided by a mobility also gradually evolve. For example, in recent years, mobilities not only transport a passenger to a destination, but also meet a passenger's needs for faster and safer travel to a destination. In addition, new devices are being added to a mobility system in order to satisfy a passenger's aesthetic taste and comfort. In addition, the existing devices like steering wheels, transmissions and acceleration/deceleration devices are also being developed so that more functions can be provided to users.

Meanwhile, a brain-computer interface or a brain-machine interface is a field of controlling a computer or a machine according to a person's intention by using brain wave signals. ERP (Event-Related Potential) is closely related to cognitive functions.

SUMMARY

The present disclosure relates to a mobility controlling method and apparatus. Particular embodiments relate to a mobility controlling method and apparatus.

An embodiment of the present invention provides an apparatus and method for determining the ride comfort of a mobility passenger based on the brain wave signal of the mobility passenger.

Another embodiment of the present invention provides an apparatus and method for controlling a mobility internal device related to a seating posture of a passenger based on a brain wave signal of the passenger in a mobility.

The embodiments of the present disclosure are not limited to the above-mentioned embodiments, and other embodiments that are not mentioned will be clearly understood by those skilled in the art through the following descriptions.

According to embodiments of the present invention, an apparatus for determining ride comfort of a passenger using brain wave signals includes an analyzer configured to determine first ride comfort information of the passenger based on information on a seating posture of at least one passenger in a mobility, a sensor configured to collect brain wave signals of the passenger in the mobility for a predetermined time, and a controller configured to control the mobility. The analyzer determines second ride comfort information obtained by correcting the first ride comfort information, by analyzing the collected brain wave signals based on the first ride comfort information, and the controller controls the mobility based on the determined second ride comfort information.

The information on the seating posture of the passenger may include at least one of personal information of the passenger, health status information of the passenger, seating information of the passenger, past posture information of the passenger, a preferred seating posture of the passenger or driving environment information.

The first ride comfort information of the passenger may be evaluation information of the seating posture of the passenger.

The evaluation information of the seating posture of the passenger may be expressed as a numerical value.

The brain wave signals may be at least one of alpha waves, beta waves and theta waves.

The analysis may include comparing the magnitude of the brain wave signal collected for the predetermined time with a predetermined threshold.

The brain wave signals may include a theta wave, and the analyzer may determine that a state of the passenger is a stress state, when a magnitude of the theta wave is greater than or equal to a predetermined threshold.

The brain wave signals may include an alpha wave, and the analyzer may determine that a state of the passenger is a comfortable state, when a magnitude of the alpha wave is greater than or equal to a predetermined threshold.

The brain wave signals may include a beta wave, and the analyzer may determine that a state of the passenger is a stress state, when a magnitude of the beta wave is greater than or equal to a predetermined threshold.

When the first ride comfort information of the passenger has a first value, the analyzer may determine the second ride comfort information using only a predetermined brain wave signal among the brain wave signals.

When the first ride comfort information of the passenger has a second value, the analyzer may apply a predetermined weight to the threshold.

The mobility may include at least one of a seat, a steering wheel, a mirror, a console box, a navigation device or a voice device.

When the second ride comfort information of the passenger is determined as a first state, the controller may control an angle of at least one of the seat of the passenger, the steering wheel, the mirror or the console box.

When the second ride comfort information of the passenger is determined as a second state, the controller may control a position of at least one of the seat of the passenger, the steering wheel, the mirror or the console box.

According to embodiments of the present invention, a method of determining ride comfort of a passenger using brain wave signals includes determining first ride comfort information of the passenger based on information on a seating posture of at least one passenger in a mobility, collecting brain wave signals of the passenger in the mobility for a predetermined time, determining second ride comfort information obtained by correcting the first ride comfort information, by analyzing the collected brain wave signals based on the first ride comfort information, and controlling the mobility based on the determined second ride comfort information.

The information on the seating posture of the passenger may include at least one of personal information of the passenger, health status information of the passenger, seating information of the passenger, past posture information of the passenger, a preferred seating posture of the passenger or driving environment information.

The first ride comfort information of the passenger may be evaluation information of the seating posture of the passenger.

The evaluation information of the seating posture of the passenger may be expressed as a numerical value.

The brain wave signals may be at least one of alpha waves, beta waves and theta waves.

The analysis may include comparing the magnitude of the brain wave signal collected for the predetermined time with a predetermined threshold.

The brain wave signals may include a theta wave, and the determining of the second ride comfort information may include determining that a state of the passenger is a stress state, when a magnitude of the theta wave is greater than or equal to a predetermined threshold.

The brain wave signals may include an alpha wave, and the determining of the second ride comfort information may include determining that a state of the passenger is a comfortable state, when a magnitude of the alpha wave is greater than or equal to a predetermined threshold.

The brain wave signals may include a beta wave, and the determining of the second ride comfort information may include determining that a state of the passenger is a stress state, when a magnitude of the beta wave is greater than or equal to a predetermined threshold.

The determining of the second ride comfort information may include determining the second ride comfort information using only a predetermined brain wave signal among the brain wave signals when the first ride comfort information of the passenger has a first value.

The determining of the second ride comfort information may include applying a predetermined weight to the threshold when the first ride comfort information of the passenger has a second value.

The mobility may include at least one of a seat, a steering wheel, a mirror, a console box, a navigation device or a voice device.

The controlling of the mobility may include controlling an angle of at least one of the seat of the passenger, the steering wheel, the mirror or the console box when the second ride comfort information of the passenger is determined as a first state.

The controlling of the mobility may include controlling a position of at least one of the seat of the passenger, the steering wheel, the mirror or the console box when the second ride comfort information of the passenger is determined as a second state.

The features briefly summarized above with respect to embodiments of the present disclosure are merely exemplary aspects of the detailed description below of the present disclosure, and do not limit the scope of the present disclosure.

BRIEF DESCRIPTION OF THE DRAWINGS

In order that the disclosure may be well understood, there will now be described various embodiments thereof, given by way of example, reference being made to the accompanying drawings, in which:

FIGS. 4A and 4B are views respectively illustrating measurement areas of ERP and Pe in one embodiment of the present disclosure;

FIG. 9 is a flowchart illustrating a method of operating an apparatus for determining the ride comfort of a user according to an embodiment of the present invention.

DETAILED DESCRIPTION OF ILLUSTRATIVE EMBODIMENTS

Figure 1:
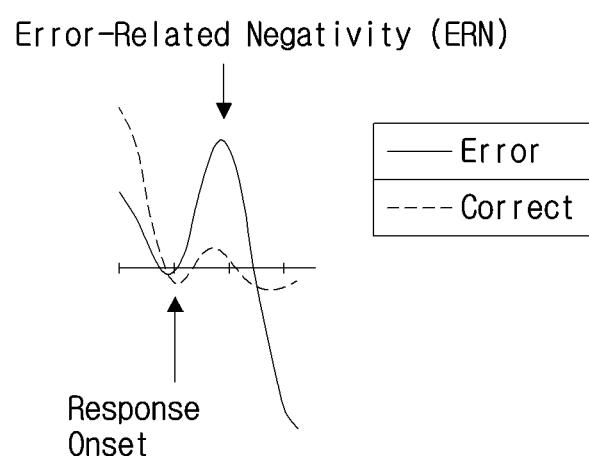
FIG. 1 is a view illustrating a general waveform of ERN in one embodiment of the present disclosure.

The following description is merely exemplary in nature and is not intended to limit the present disclosure, application, or uses. It should be understood that throughout the drawings, corresponding reference numerals indicate like or corresponding parts and features.

The following description is merely exemplary in nature and is not intended to limit the present disclosure, application, or uses. It should be understood that throughout the drawings, corresponding reference numerals indicate like or corresponding parts and features.

Exemplary embodiments of the present disclosure will be described in detail such that the ordinarily skilled in the art would easily understand and implement an apparatus and a method provided by embodiments of the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure.

In embodiments of the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in embodiments of the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and are not used to show order or priority among elements. For instance, a first element discussed below could be termed a second element without departing from the teachings of the present disclosure. Similarly, the second element could also be termed as the first element.

In embodiments of the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure. Also, the terms, such as 'unit' or 'module', etc., should be understood as a unit that processes at least one function or operation and that may be embodied in a hardware manner (e.g., a processor), a software manner, or a combination of the hardware manner and the software manner.

In embodiments of the present disclosure, all of the constituent elements described in various forms should not be construed as being essential elements but some of the constituent elements may be optional elements. Accordingly, embodiments configured by respective subsets of constituent elements in a certain form also may fall within the scope of the present disclosure. In addition, embodiments configured by adding one or more elements to various elements also may fall within the scope of the present disclosure.

As an electrical activity of neurons constituting a brain, a brain wave signal (or brain signal, brain wave) means a bio signal that directly and indirectly reflects a conscious or nonconscious state of a person. A brain wave signal can be measured in every area of human scalp, and its wavelength has a frequency of mainly 30 Hz or below and a potential difference of scores of microvolts. Depending on brain activity and state, various waveforms may appear. Research on interface control using a brain wave signal according to a person's intention is under way. A brain wave signal may be obtained by using EEG (Electro Encephalo Graphy) using electrical signals caused by brain activities, MEG (Magneto Encephalo Graphy) using magnetic signals occurring with electrical signals, and fMRI (functional Magnetic Resonance Imaging) or fNIRS (functional Near-Infrared Spectroscopy) using a change of oxygen saturation in the blood. Although fMRI and fNIRS are useful techniques for measuring brain activities, fMRI has a low time-resolution and fNIRS has a low spatial-resolution in general. Due to these limitations, EEG signals are mostly used by virtue of excellent portability and time-resolution.

A brain wave signal changes spatially and over time according to brain activity. As a brain wave signal is usually difficult to analyze and its waveform is not easy to visually analyze, various processing methods are proposed.

For example, according to the number of oscillations (frequency), brain wave signals may be classified based on frequency bands (power spectrum classification). The classification considers a measured brain wave signal as a linear sum of simple signals at each specific frequency, decomposes the signal into each frequency component and indicates a corresponding amplitude. A brain wave signal at each frequency may be obtained by using pre-processing normally for noise elimination, the Fourier transform into frequency domain, and a band-pass filter (BPF).

More particularly, according to frequency band, brain waves may be classified into delta, theta, alpha, beta and gamma waves. Delta waves are brain waves with a frequency of 3.5 Hz or below and an amplitude of 20~200 μV, mainly appearing in normal deep sleep or newborns. In addition, delta waves may increase as our awareness of the physical world decreases. Generally, theta waves are brain waves with a frequency of 3.5~7 Hz, mainly appearing in emotionally stable states or in sleep.

In addition, theta waves are generated mainly in the parietal cortex and in the occipital cortex and may appear during calm concentration for recollecting a memory or meditating. Generally, alpha waves are brain waves with a frequency of 8~12 Hz, mainly appearing in relaxed and comfortable states. In addition, alpha waves are normally generated in the occipital cortex during rest and may diminish in sleep. Generally, beta waves are brain waves with a frequency of 13~30 Hz, mainly appearing in a state of tension, which is bearable enough, or while a certain level of attention is paid. In addition, beta waves are mainly generated in the frontal cortex and are related to an awakened state or concentrated brain activities, pathological phenomena and medicinal effects. Beta waves may appear in a wide area throughout the brain. In addition, specifically, the beta waves may be divided into SMR waves with a frequency of 13~15 Hz, mid-beta waves with a frequency of 15~18 Hz and high beta waves with a frequency of 20 Hz and above. As beta waves appear to be stronger under stress like anxiety and tension, they are called stress waves. Gamma waves are brain waves that generally have a frequency of 30~50 Hz, mainly appearing in a strongly excited state or during high-level cognitive information processing. In addition, gamma waves may appear in an awaking state of consciousness and during REM sleep and may also be overlapped with beta waves.

Each of the brain wave signals according to frequency band is associated with a specific cognitive function. For example, delta waves are associated with sleep, theta waves are associated with working memory, and alpha waves are associated with attention or inhibition. Thus, the property of a brain wave signal at each frequency band selectively displays a specific cognitive function. In addition, the brain wave signal at each frequency band may show a little different aspect in each measuring part on the surface of the head. The cerebral cortex may be divided into frontal cortex, parietal cortex, temporal cortex and occipital cortex. These parts may have a few different roles. For example, the occipital cortex corresponding to the back of head has the primary visual cortex and thus can primarily process visual information. The parietal cortex located near the top of head has the somatosensory cortex and thus can process motor/sensory information. In addition, the frontal cortex can process information related to memory and thinking, and the temporal cortex can process information related to auditory sense and olfactory sense.

Meanwhile, for another example, a brain wave signal may be analyzed by using ERP (Event-Related Potential). ERP is an electrical change in a brain in association with a stimulus from outside or a psychological process inside. ERP means a signal including an electrical activity of the brain, which is caused by a stimulus including specific information (for example, image, voice, sound, command of execution, etc.) after a certain time since the stimulus is presented.

To analyze an ERP, a process of separating a signal from a noise is desired. An averaging method may be mainly used.

Particularly, by averaging brain waves measured based on stimulus onset time, it is possible to remove brain waves, which are not related to a stimulus, and to pick out only a related potential, that is, a brain activity commonly associated with stimulus processing.

As ERP has a high time resolution, it is closely related to research on cognitive function. ERP is an electrical phenomenon that is evoked by an external stimulus or is related to an internal state. According to types of stimuli, ERPs may be classified into auditory sense-related potentials, sight-related potentials, somatic sense-related potentials and olfactory sense-related potentials. According to properties of stimuli, ERPs may be classified into exogenous ERPs and endogenous ERPs. Exogenous ERPs have a waveform determined by an external stimulus, are related to automatic processing, and mainly appear in the initial phase of being given the stimulus. For example, exogenous ERPs are brainstem potentials. On the other hand, endogenous ERPs are determined by an internal cognitive process or a psychological process or state, irrespective of stimuli, and are related to 'controlled processing'. For example, endogenous ERPs are P300, N400, P600, CNV (Contingent Negative Variation), etc.

Names given to ERP peaks normally include a polarity and a latent period, and the peak of each signal has an individual definition and meaning. For example, the positive potential is P, the negative potential is N, and P300 means a positive peak measured about 300 ms after the onset of a stimulus. In addition, 1, 2, 3 or a, b, c and the like are applied according to the order of appearance. For example, P3 means a third positive potential in waveform after the onset of a stimulus.

Hereinafter, various ERPs will be described.

For example, N100 is related to a response to an unpredictable stimulus.

MMN (Mismatch Negativity) may be generated not only by a focused stimulus but also by a non-focused stimulus. MMN may be used as an indicator for whether or not a sense memory (echoic memory) operates before initial attention. P300, which will be described below, appears in a process of paying attention and making judgment, while MMN is analyzed as a process occurring in the brain before paying attention.

For another example, N200 (or N2) is mainly generated according to visual and auditory stimuli and is related to short-term memory or long-term memory, which are types of memories after attention, along with P300 described below.

For yet another example, P300 (or P3) mainly reflects attention to a stimulus, stimulus cognition, memory search and alleviation of uncertain feeling and is related to a perceptual decision distinguishing stimuli from outside. As the generation of P300 is related to a cognitive function, P300 is generated irrespective of types of presented stimuli. For example, P300 may be generated in auditory stimuli, visual stimuli and somatic stimuli. P300 is widely applied to research on the brain-computer interface.

For yet another example, N400 is related to language processing and is caused when a sentence or an auditory stimulus with a semantic error is presented. In addition, N400 is related to a memory process and may reflect a process of retrieving or searching information from long-term memory.

For yet another example, as an indicator showing reconstruction or recollective process, P600 is related to a process of processing a stimulus more accurately based on information stored in long-term memory.

For yet another example, CNV refers to potentials appearing for 200~300 ms and even for a few seconds in the later phase. It is also called slow potentials (SPs) and is related to expectancy, preparation, mental priming, association, attention and motor activity.

For yet another example, ERN (Error-Related Negativity) or Ne (error negativity) is an event-related potential (ERP) generated by a mistake or an error. It may occur when a subject makes a mistake in a sensorimotor task or a similar task. More particularly, when a subject cognizes a mistake or an error, ERN is generated and its negative peak appears mainly in the frontal and central zones for about 50~150 ms. Especially, it may appear in a situation where a mistake related to motor response is likely to occur, and may also be used to indicate a negative self-judgment.

Hereinafter, the major features of ERN will be described in more detail.

FIG. 1 is a view illustrating a general waveform of ERN according to one embodiment of the present disclosure.

Referring to FIG. 1, negative potential values are depicted above the horizontal axis, and positive potential values are depicted below the horizontal axis. In addition, it can be confirmed that an ERP with a negative peak value is generated within a predetermined time range after a response onset for an arbitrary motion. Herein, the response may mean a case where a mistake or an error is made (Error Response). In addition, the predetermined time range may be about 50~150 ms. Alternatively, the predetermined time range may be about 0~100 ms. Meanwhile, in the case of a correct response, an ERP is generated which has a relatively smaller negative peak than ERN.

As an ERP of initial negativity, ERN is time-locked until a response error occurs. In addition, ERN is known to reflect the reinforcement activity of a dopaminergic system related to behavioral monitoring. ERN includes the fronto-striatal loop including the rostral cingulate zone. Meanwhile, dopamine is associated with the reward system of brain that usually forms a specific behavior and motivates a person thereby providing pleasure and reinforced feelings. When a behavior obtaining an appropriate reward is repeated, it is learned as a habit. In addition, more dopamine is released through emotional learning, and a new behavior is attempted due to the release of dopamine. Thus, reward-driven learning is called reinforcement learning.

In addition, ERN may be generated in 0~100 ms after the onset of an erroneous response that is caused during an interference task (for example, Go-noGo task, Stroop task, Flanker task, and Simon task) through the frontal cortex lead.

In addition, together with CRN described below, ERN is known to reflect a general behavior monitoring system that can distinguish a right behavior and a wrong behavior.

In addition, the fact that ERN reaches a maximum amplitude at the frontal cortex electrode is known to reflect that an intracerebral generator is located in the rostral cingulate zone or the dorsal anterior cingulate cortex (dACC) zone.

In addition, ERN may show a change of amplitude according to a negative emotional state.

In addition, ERN may be reported even in a situation where behavioral monitoring is performed based on external evaluation feedback processing unlike internal motor expression, and may be classified as FRN described below.

In addition, ERN may be generated not only when having cognized a mistake or an error but also before cognizing the mistake or the error.

In addition, ERN may be generated not only as a response to his/her own mistake or error but also as a response to a mistake or error of others.

In addition, ERN may be generated not only as a response to a mistake or an error but also as a response to anxiety or stress for a predetermined performance task or object.

In addition, as a larger peak value of ERN is obtained, it may be considered as reflecting a more serious mistake or error.

Meanwhile, for yet another example, being an event-related potential (ERP) that is generated after ERN, Pe (Error Positivity) is an ERP with a positive value, which is generated mainly at the frontal cortex electrode in about 150~300 ms after a mistake or an error. Pe is known as a reaction that realizes a mistake or an error and pays more attention. In other words, Pe is related to an indicator of a conscious error information processing process after error detection. ERN and Pe are known as ERPs related to error monitoring.

Hereinafter, the major features of Pe will be described in more detail.

Figure 2:
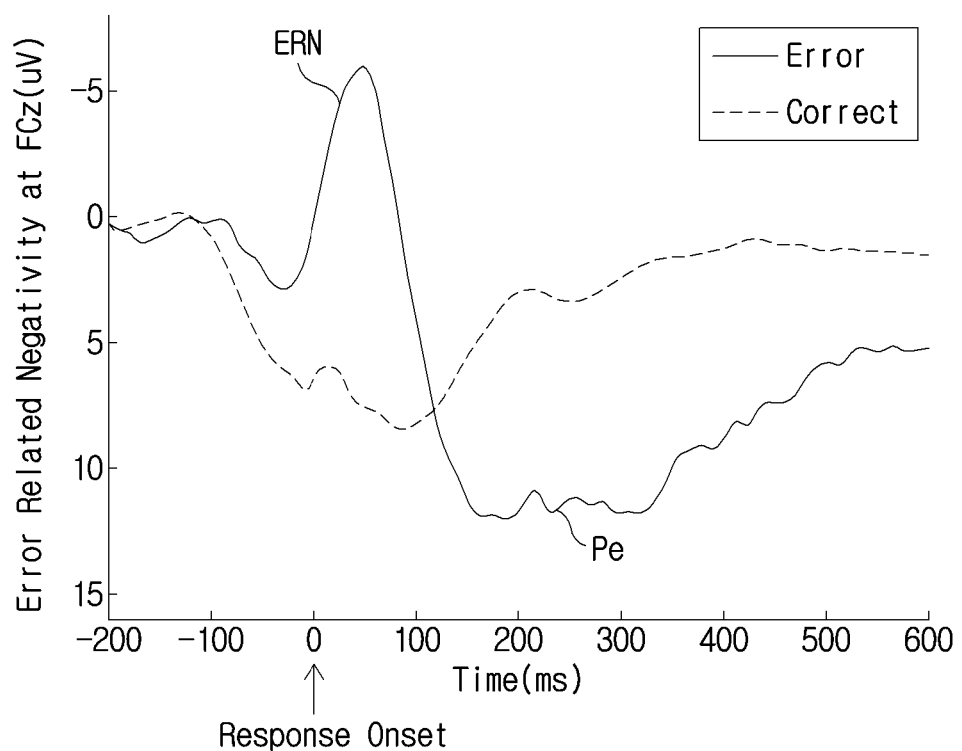
FIG. 2 is a view illustrating general waveforms of ERN and Pe according to one embodiment of the present disclosure.

FIG. 2 is a view illustrating general waveforms of ERN and Pe according to another embodiment of the present disclosure.

Referring to FIG. 2, negative potential values are depicted above positive potential values. In addition, it can be confirmed that an ERP with a negative peak value, that is an ERN, is generated within a first predetermined time range after a response onset for an arbitrary motion. Herein, the response may mean a case where a mistake or an error is made (Error Response). In addition, the first predetermined time range may be about 50~150 ms. Alternatively, the first predetermined time range may be about 0~200 ms.

In addition, it can be confirmed that an ERP with a positive peak value, that is a Pe, is generated within a second predetermined time range after the onset of the ERN. In addition, the second predetermined time range may be about 10~300 ms after an error onset. Alternatively, the second predetermined time range may mean about 200~400 ms.

Figure 3:
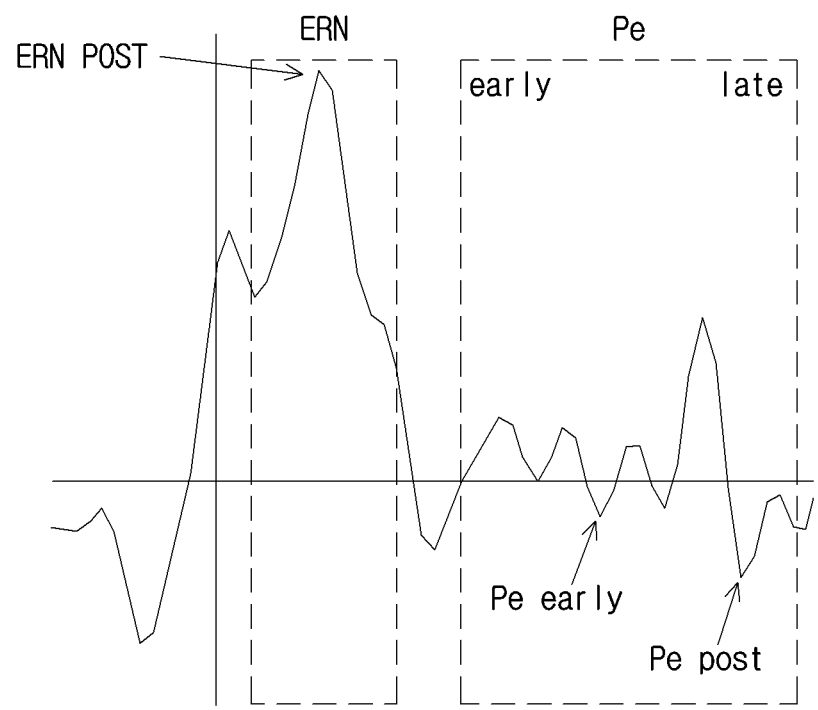
FIG. 3 is a view illustrating a deflection characteristic of Pe according to another embodiment of the present disclosure.

FIG. 3 is a view illustrating a deflection characteristic of Pe in one embodiment of the present disclosure.

Referring to FIG. 3, like P3, Pe has a wide deflection characteristic, and the plexus generator includes not only the areas of posterior cingulate cortex and insula cortex but also more anterior cingulate cortex.

In addition, Pe may reflect an emotional evaluation of an error and an attention to a stimulus like P300. In addition, ERN indicates a conflict between a right response and a wrong response, and Pe is known to be a response that realizes a mistake and pays more attention. In other words, ERN may be generated in a process of detecting a stimulus, and Pe may be generated depending on attention in a process of processing a stimulus. When ERN and/or Pe have relatively large values respectively, it is known that the values are related to an adaptive behavior intended to respond more slowly and more accurately after a mistake.

FIGS. 4A and 4B are views illustrating measurement areas of ERP and Pe according to one embodiment of the present disclosure.

ERN and Pe are known as ERPs related to error monitoring. Regarding the measurement areas of ERN and Pe, a largest negative value and a largest positive value may normally be measured in the central area. However, there may be a little difference according to measurement conditions. For example, FIG. 4A is the main area where ERN is measured, and the largest negative value of ERN may normally be measured in the midline frontal or central zone (that is, FCZ). In addition, FIG. 4B is the main area where Pe is measured, and a large positive value of Pe may normally be measured in a posterior midline zone as compared to ERN.

Meanwhile, for yet another example, FRN (Feedback-Related Negativity) is an event-related potential (ERP) that is related to error detection obtained based on external evaluation feedback. ERN and/or Pe detect an error based on an internal monitoring process. However, in the case of FRN, when being obtained based on external evaluation feedback, it may operate similarly to the process of ERN.

In addition, FRN and ERN may share many electrophysiological properties. For example, FRN has a negative peak value at the frontal cortex electrode in about 250~300 ms after the onset of a negative feedback and may be generated in the dorsal anterior cingulate cortex (dACC) zone like ERN.

In addition, like ERN, FRN may reflect an activity of reinforcement learning by a dopaminergic system. In addition, FRN normally has a larger negative value than a positive feedback and may have a larger value for an unforeseen case than for a predictable result.

Figure 5:
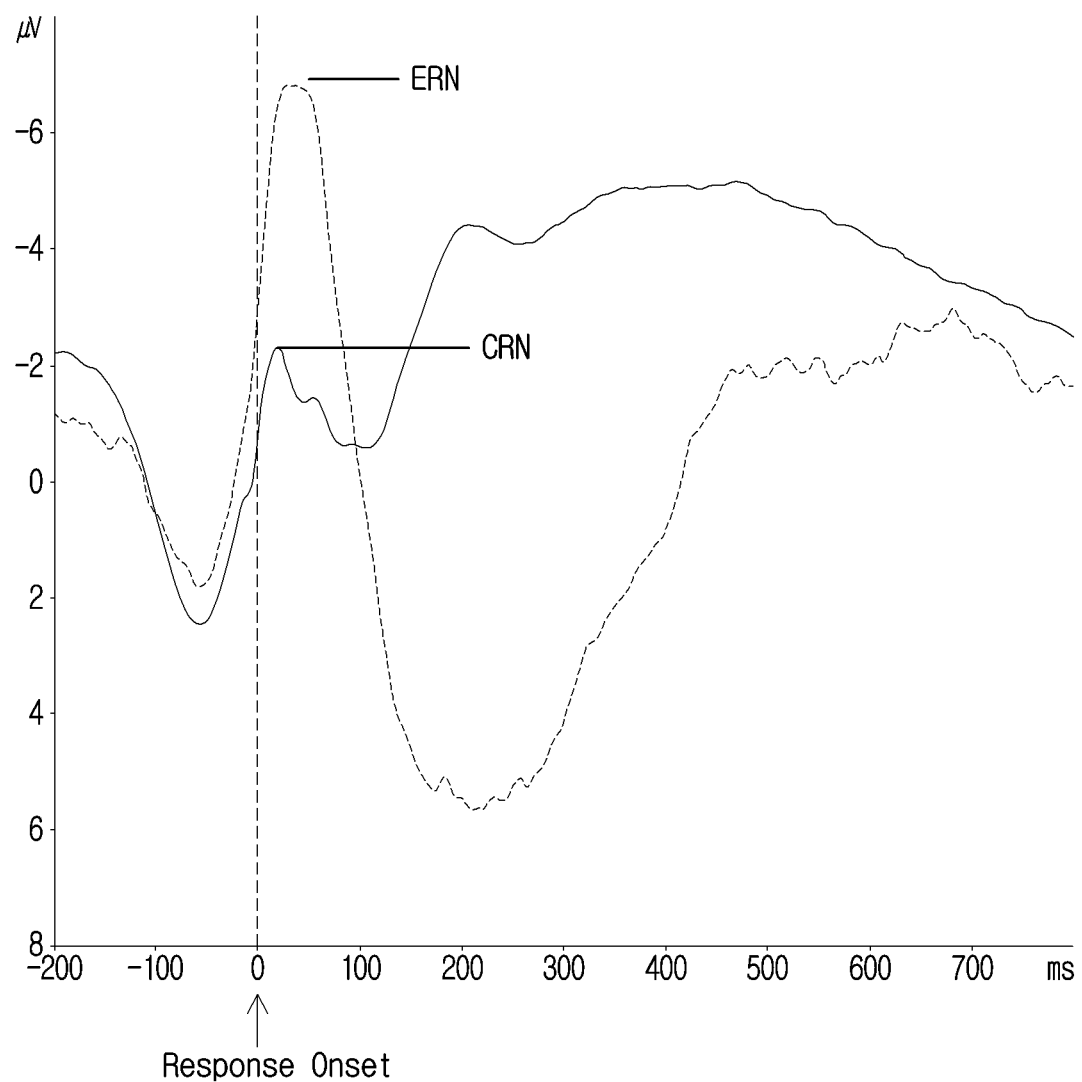
FIG. 5 is a view illustrating general waveforms of ERN and CRN according to one embodiment of the present disclosure.

For yet another example, CRN (Correct-Related Negativity) is an ERP generated by a correct trial and is a negative value that is smaller than ERN. Like ERN, CRN may be generated in the initial latent period (for example, 0~100 ms). FIG. 5 is a view illustrating general waveforms of ERN and CRN in one embodiment of the present disclosure.

For yet another example, Pc (Correct Positivity) is an event-related potential generated following CRN. It is an event-related potential generated in about 150~300 ms after the onset of correct response. The relation between CRN and Pc may be similar to the relation between ERN and Pe.

Meanwhile, ERPs may be classified into stimulus-locked ERPs and response-locked ERPs. The stimulus-locked ERPs and the response-locked ERPs may be divided according to criteria like evoking cause of ERP and response time. For example, an ERP evoked from a moment when a word or a picture is presented to a user from outside may be called a stimulus-locked ERP. In addition, for example, an ERP evoked from a moment when a user speaks or pushes a button may be called a response-locked ERP. Accordingly, based on the above-described criterion, in general, stimulus-locked ERPs are N100, N200, P2, P3, etc., and response-locked ERPs are ERN, Pe, CRN, Pc, FRN, etc.

Meanwhile, brain waves may be classified according to manifesting motives. Brain waves may be classified into spontaneous brain waves (spontaneous potentials) manifested by a user's will and evoked brain waves (evoked potentials) that are naturally manifested according to external stimuli irrespective of the user's will. Spontaneous brain waves may be manifested when a user moves on his/her own or imagines a movement, while evoked brain waves may be manifested by visual, auditory, olfactory and tactile stimuli, for example.

Meanwhile, brain wave signals may be measured in accordance with the International 10-20 system. The International 10-20 system determines measurement points of brain wave signals on the basis of the relationship between the location of an electrode and the cerebral cortex areas.

Figure 6:
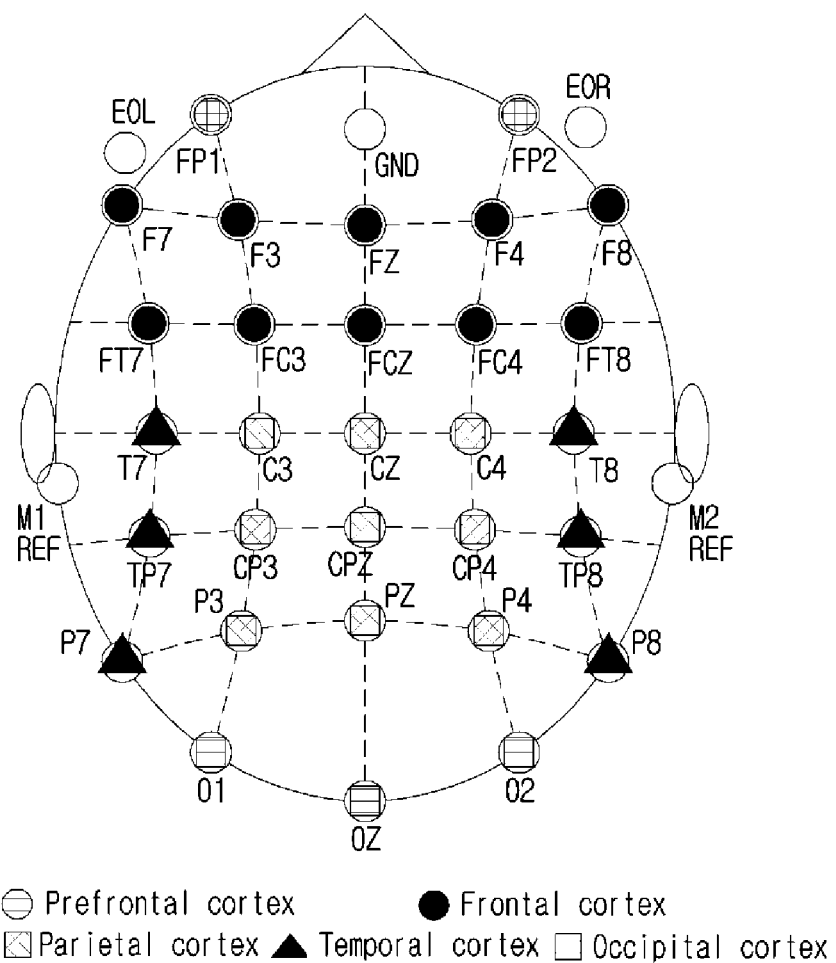
FIG. 6 is a view illustrating EEG measurement channels corresponding to cerebral cortex areas in one embodiment of the present disclosure.

FIG. 6 is a view illustrating EEG measurement channels corresponding to the cerebral cortex areas according to one embodiment of the present disclosure.

Referring to FIG. 6, brain areas (Prefrontal cortex FP1, FP2; Frontal cortex F3, F4, F7, F8, FZ, FC3, FC4, FT7, FT8, FCZ; Parietal cortex C3, C4, CZ, CP3, CP4, CPZ, P3, P4, PZ; Temporal cortex T7, T8, TP7, TP8, P7, P8; Occipital cortex O1, O2, OZ) correspond to 32 brain wave measurement channels. For each of the channels, data may be obtained and analysis may be performed for each cerebral cortex area by using the data.

Figure 7:
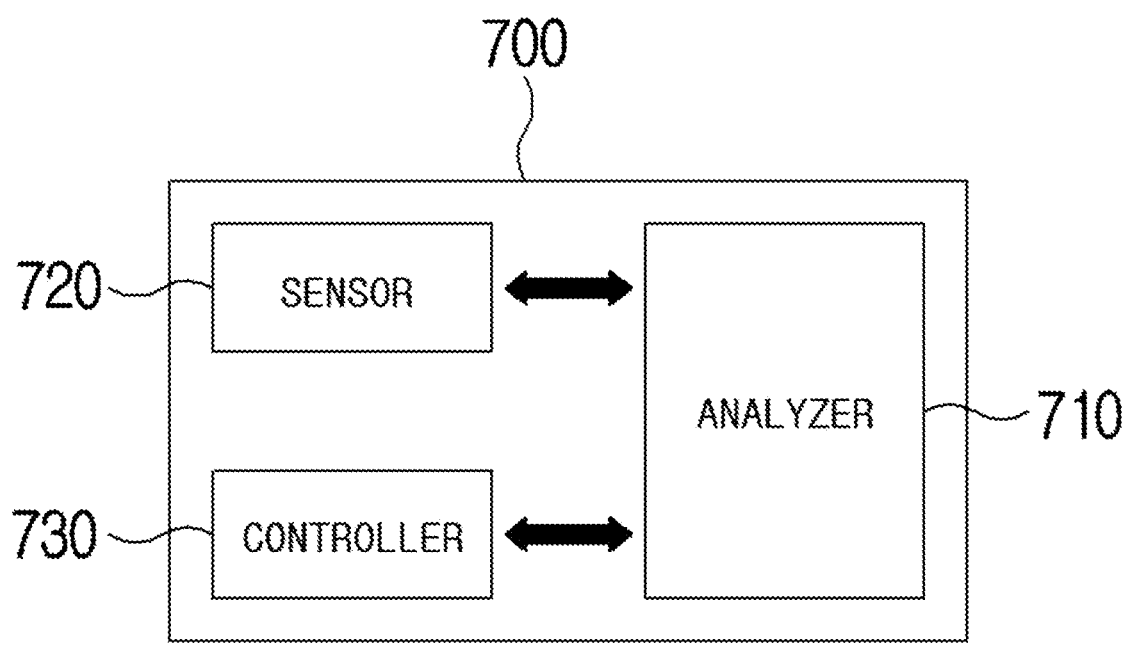
FIG. 7 is a block diagram illustrating a configuration of an apparatus for determining the ride comfort of a passenger based on brain wave signals of the passenger according to an embodiment of the present invention.

FIG. 7 is a block diagram illustrating a configuration of an apparatus for determining the ride comfort of a passenger based on brain wave signals of the passenger according to an embodiment of the present invention.

Ride comfort may generally mean overall comfort for a mobility or a feeling of mobility vibration. Main factors affecting ride comfort include a suspension, a tire, a seat, an engine, a transmission and mobility body rigidity. The suspension is a general term for a shock absorbing system of a mobility, such as a spring supporting the weight of the mobility, and serves to prevent the vibration of a road surface from being transmitted to passengers. Vibrations or shocks felt by the passengers in the mobility may vary according to the settings of the suspension. In addition, the tire is a device for primarily filtering out shocks generated on the road surface, and the ride comfort may vary according to the sidewall of the tire or tire pressure. In addition, for the seat, special-purpose seats considering the comfort of passengers have been developing beyond the function of a simple chair. In addition, the engine and the transmission may affect vibration and noise generated in the mobility. In addition, the mobility body rigidity may affect collision stability, driving performance and the ride comfort of the passenger. In addition, the factors affecting the ride comfort may include seating information of a passenger and driving environment information.

As described above, various factors of the mobility may affect the ride comfort of the passenger. However, since the ride comfort means the overall feelings of the passenger in the driving environment, in order to define the term ride comfort, not only objective factors such as mobility information, passenger seating information and driving environment information but also subjective factors such as psychological comfort and stability of the passenger need to be considered.

Meanwhile, the ride comfort may be expressed by the posture of the passenger due to the objective factors or the psychological state of the passenger due to the subjective factors. Alternatively, the posture of the passenger and the psychological state of the passenger may be expressed as a numerical value.

Accordingly, the ride comfort of the passenger determined using the objective information of the mobility and/or the passenger may be corrected in consideration of the subjective information such as the psychological state of the passenger.

For example, even if the ride comfort of the passenger is primarily determined as a state A using the objective information of the mobility and/or the passenger, the ride comfort may be finally/secondarily determined as a state B or a state (A+a) in consideration of the psychological state of the passenger.

As another example, even if the ride comfort of the passenger is primarily determined as a "posture preferable for driving" using the objective information of the mobility and/or the passenger, the ride comfort may be finally determined as a "posture unpreferable for driving" or a "posture which does not burden the waist but causes stress" in consideration of the psychological state of the passenger.

As another example, even if the ride comfort of the passenger is primarily determined as a "posture unpreferable for driving" using the objective information of the mobility and/or the passenger, the ride comfort may be secondarily determined as a "posture which is difficult to drive but helps to reduce stress" in consideration of the psychological state of the passenger.

As another example, even if the ride comfort of the passenger is primarily determined as a "posture which burdens the waist" using the objective information of the mobility and/or the passenger, the ride comfort may be finally determined as a "posture which burdens the waist but is comfortable" in consideration of the psychological state of the passenger.

Meanwhile, since a brain wave signal may reflect the psychological state of the passenger or a response to a certain stimulus, secondary and final information on the ride comfort of the passenger may be acquired by analyzing the brain wave signal. For example, the brain wave signal classified for each frequency band may reflect feelings such as comfort, anxiety and stress of the passenger.

For example, alpha waves are generally brain waves having a frequency of 8 to 12 Hz and mainly appear in a relaxed state. In addition, the alpha waves are mainly generated in the frontal or occipital lobe and tend to decrease when stress occurs.

As another example, beta waves are generally brain waves having a frequency of 13 to 30 Hz and mainly appear in a slight tension or when more than a certain level of attention is paid. In addition, the beta waves are mainly generated in the frontal lobe and appear to be stronger under stress such as anxiety and tension. Therefore, the beta waves are called stress waves.

As another example, theta waves are generally brain waves having a frequency of 3.5 to 7 Hz and are mainly generated in the parietal and occipital lobes. In addition, the theta waves tend to increase when stress occurs.

As described above, when stress does not occur, the alpha waves may be measured as dominant signals and, when stress occurs, the beta waves and/or the theta waves may be measured as dominant signals.

Accordingly, by analyzing the brain wave signals of the passenger collected for a predetermined time, the psychological state of the passenger may be determined. That is, whether the passenger is in a comfortable state or an anxious state may be determined by detecting the magnitude of the brain wave signals for each frequency, such as the alpha waves, the beta waves and the theta waves.

As a result, the final/secondary ride comfort information of the passenger may be acquired based on information on the seating posture of the passenger or the primary ride comfort of the passenger.

Meanwhile, the mobility may include a mobility, a mobile/transport device, etc.

Referring to FIG. 7, the apparatus 700 for determining the ride comfort using the brain wave signals may include an analyzer 710, a sensor 720 and/or a controller 730. It should be noted, however, that only some of the components necessary for explaining the present embodiment are shown, and the components included in the apparatus 700 for determining the ride comfort of the passenger are not limited to the above-described example. For example, two or more constituent units may be implemented in one constituent unit, and an operation performed in one constituent unit may be divided and executed in two or more constituent units. Also, some of the constituent units may be omitted or additional constituent units may be added.

The apparatus 700 for determining the ride comfort of embodiments of the present disclosure may determine first ride comfort information of the passenger based on the information on the seating posture of at least one passenger in the mobility. In addition, the analyzer 710 may perform the above operation.

Here, the information on the seating posture of the passenger may mean a variety of information which may be used to determine the ride comfort of the passenger. In addition, the information on the seating posture of the passenger may mean objective factors affecting the ride comfort of the passenger.

For example, the information on the seating posture of the passenger may include personal information of the passenger. For example, this may include body information such as the gender, age, weight, actual height and height when seated of the passenger.

As another example, the information on the seating posture of the passenger may include health status information of the passenger. For example, this may include the joint state, muscle fatigue, herniated lumbar disc, herniated cervical disc, etc. of the passenger.

As another example, the information on the seating posture of the passenger may include driving environment information. For example, this may include information on a road on which the mobility will travel, mobility model information, traffic volume information, etc. Specifically, the information on the road on which the mobility will travel may include information on whether the driving road is a general road or an express road, include information on whether the driving road is a national road or a local road in case of the general road, and include information on whether the driving road is a free road or a toll road.

As another example, the information on the seating posture of the passenger may include the seating information of the passenger. For example, this may include mobility seat position/angle information, pressure distribution for each mobility seat back angle, the angle of the pelvis of the passenger, lumbar curvature, lumbosacral joint load, hip-point information, etc.

As another example, the information on the seating posture of the passenger may include past posture information of the passenger or a preset preferred seating posture of the passenger.

As another example, the information on the seating posture of the passenger may include information on a driving pattern of the passenger.

Here, the first ride comfort information of the passenger may mean objective evaluation information of the seating posture of the passenger. For example, this may mean ergonomic (or anatomical) evaluation information determined using the information on the passenger, the health status information, the seating information of the passenger and the driving environment information.

For example, the first ride comfort information of the passenger may include a "recommended posture" and a "non-recommended posture".

As another example, the first ride comfort information of the passenger may include a "posture preferable for driving", a "position unpreferable for driving" and a "posture which burdens the waist".

As another example, the first ride comfort information of the passenger may be expressed as a numerical value. The numerical value may represent a numerical evaluation of the riding posture of the passenger. For example, the numerical value may have a value from 0 to 100. The "posture preferable for driving" may be expressed as 100 and the "posture dangerous for driving" may be expressed as 0.

As another example, each seating position information may be expressed as a numerical value. For example, mobility seat position/angle information, pressure distribution for each mobility seat back angle, the angle of the pelvis of the passenger, lumbar curvature, lumbosacral joint load, hip-point information, etc. may be expressed as numerical values. In addition, the first ride comfort information may be acquired by collecting the information expressed as numerical values.

The apparatus 700 for determining the ride comfort of embodiments of the present disclosure may collect the brain wave signals of the passenger in the mobility for a predetermined time. In addition, the sensor 720 may perform the above operation.

Here, the brain wave signals may mean brain wave signals for each frequency band. For example, the brain wave signals may include alpha waves, beta waves and theta waves.

In addition, collecting the brain wave signals for the predetermined time may include measuring the brain wave signals of at least one passenger in the mobility and detecting the brain wave signals for each frequency band from the measured brain wave signals.

The apparatus 700 for determining the ride comfort of embodiments of the present disclosure may determine second ride comfort information obtained by correcting the first ride comfort information, by analyzing the collected brain wave signals. In addition, the apparatus 700 for determining the ride comfort of embodiments of the present disclosure may determine the second ride comfort information obtained by correcting the first ride comfort information, by analyzing the collected brain wave signal based on the first ride comfort information. In addition, the analyzer 710 may perform the above operation.

Here, the second ride comfort information of the passenger may mean information obtained by correcting the first ride comfort information. That is, this may mean evaluation information obtained by reflecting the psychological state of the passenger in the objective evaluation information of the seating posture of the passenger.

For example, the second ride comfort information of the passenger may mean information obtained by adding evaluation information of the psychological state of the passenger to ergonomic (or anatomical) evaluation information determined using the information on the passenger, the health status information, the seating information of the passenger and the driving environment information.

As another example, the second ride comfort information of the passenger may mean information obtained by correcting, using the evaluation information of the psychological state of the passenger, ergonomic (or anatomical) evaluation information determined using the information on the passenger, the health status information, the seating information of the passenger and the driving environment information.

As another example, the second ride comfort information of the passenger may include a "recommended posture" and a "non-recommended posture".

As another example, the second ride comfort information of the passenger may include a "posture preferable for driving", a "position unpreferable for driving" and a "posture which burdens the waist".

As another example, the second ride comfort information of the passenger may be expressed as a numerical value. The numerical value may represent a numerical evaluation of the riding posture of the passenger. For example, the numerical value may have a value from 0 to 100. The "posture preferable for driving" may be expressed as 100 and the "posture dangerous for driving" may be expressed as 0.

As another example, when the first ride comfort information is 50 and the second ride comfort information is a "posture causing stress", the second ride comfort information may be finally expressed as 30.

That is, when the first ride comfort information is expressed as a numerical value, the second ride comfort information may be expressed as a secondary and final numerical value which is corrected by reflecting the evaluation information of the psychological state of the passenger.

As another example, even if the first ride comfort is determined as a state A, the second ride comfort information of the passenger may be finally/secondarily determined as a state B or (A+a) in consideration of the psychological state of the passenger. For example, the second ride comfort information of the passenger may be expressed as a "posture which does not burden the waist but causes stress", "posture which is difficult to drive but helps to reduce stress" or a "posture which burdens the waist but is comfortable".

As another example, the collected brain wave signals such as alpha waves, beta waves and theta waves may be expressed as numerical values. In addition, the second ride comfort information may be acquired by collecting the information expressed as numerical values.

Here, the analysis may include comparing the magnitude of the brain wave signal for each frequency band collected for the predetermined time with a predetermined threshold. In addition, the analysis may include extracting the brain wave signal for each frequency band.

Here, the threshold may be a predetermined value or a value input by a user.

Figure 8A:
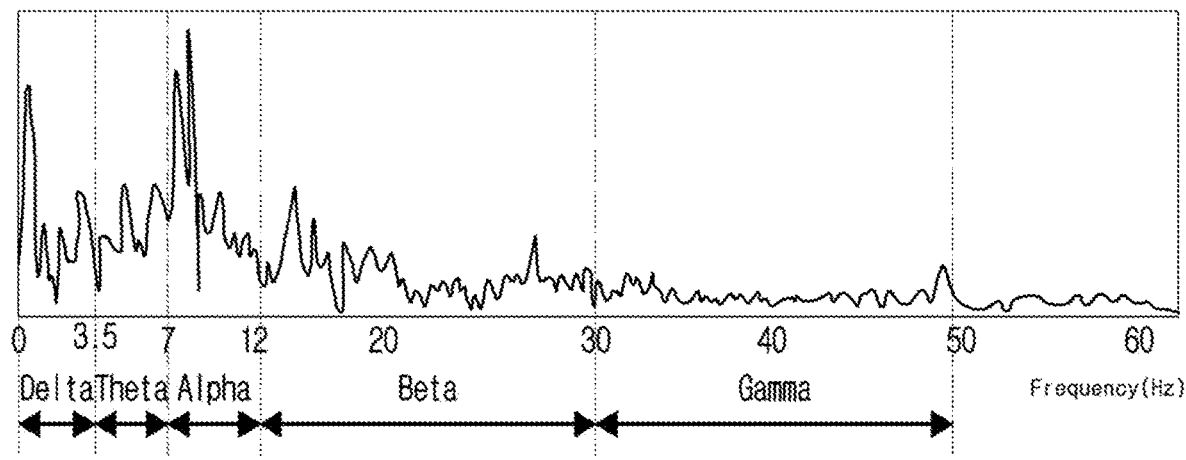
FIGS. 8A and 8B are views illustrating a process of comparing a brain wave signal for each frequency band with a predetermined threshold according to an embodiment of the present invention.
Figure 8B:
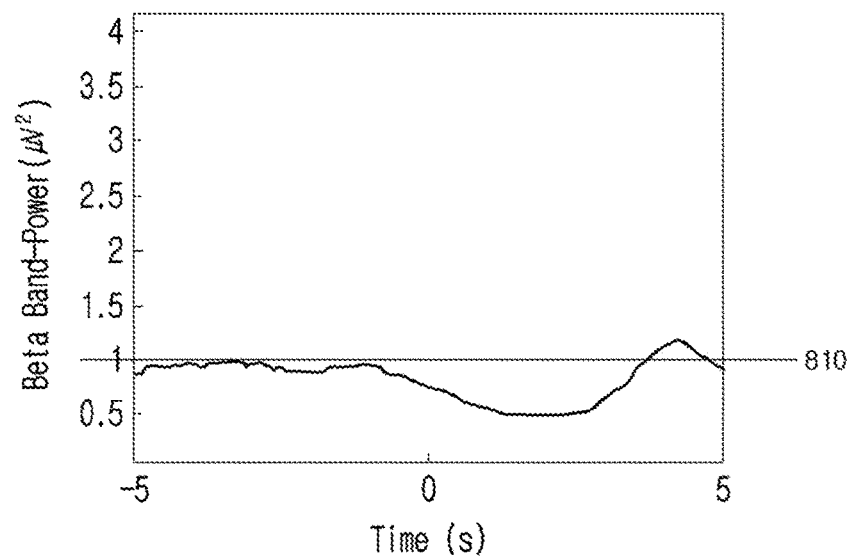

FIGS. 8A and 8B are views illustrating a process of comparing a brain wave signal for each frequency band with a predetermined threshold according to an embodiment of the present invention.

For example, when the magnitude of the theta wave is greater than or equal to the predetermined threshold, it may be determined that the state of the passenger is a stress state or a posture causing stress.

As another example, when the magnitude of the alpha wave is less than the predetermined threshold, it may be determined that the state of the passenger is a stress state. Alternatively, when the magnitude of the alpha wave is greater than or equal to the predetermined threshold, it may be determined that the state of the passenger is a comfortable state or a posture which helps to reduce stress.

As another example, when the magnitude of the beta wave is greater than or equal to the predetermined threshold, it may be determined that the state of the passenger is a stress state. Referring to FIG. 8B, in a time interval in which the magnitude of the beta wave is greater than or equal to the predetermined threshold 810, it may be determined that the state of the passenger is a stress state.

Meanwhile, the state of the passenger may be determined by combining the brain wave signals for each frequency.

For example, when a ratio of the magnitude of the beta wave to the magnitude of the alpha wave is greater than or equal to a predetermined threshold, it may be determined that the state of the passenger is a stress state.

As another example, when a ratio of the magnitude of the theta wave to the magnitude of the alpha wave is greater than or equal to a predetermined threshold, it may be determined that the state of the passenger is a stress state.

As another example, when a ratio of the magnitude of linear combination of the theta and beta waves to the magnitude of the alpha wave is greater than or equal to a predetermined threshold, it may be determined that the state of the passenger is a stress state.

As another example, only brain wave signals having the predetermined threshold may be selected from the brain wave signals for each frequency and the state of the passenger may be determined using the selected brain wave signals. That is, the selected brain wave signals may be factors used to improve the satisfaction of the ride comfort of the passenger.

Here, the magnitude of the brain wave signal for each frequency may mean the power of a frequency band within a predetermined range. That is, the magnitude of the brain wave signal for each frequency may mean the power of the frequency band into which the measured signals are transformed using Fourier transform in a frequency domain.

In addition, the analysis may include determining the second ride comfort information obtained by correcting the first ride comfort information, by analyzing the collected brain wave signals based on the first ride comfort information.

For example, when the ride comfort of the passenger is primarily determined as a state A using the objective information of the mobility and/or the passenger, a predetermined weight is applicable to the predetermined threshold according to the state A. The predetermined weight may be a predetermined value or a value input by a user. At this time, the brain wave signals may include alpha waves, beta waves and theta waves.

For example, when the ride comfort of the passenger is primarily determined as a "posture preferable for driving" using the objective information of the mobility and/or the passenger, the magnitude of the threshold of the alpha wave which mainly appears in the comfortable state may be set to be relatively small.

As another example, when the ride comfort of the passenger is primarily determined as a "posture unpreferable for driving" using the objective information of the mobility and/or the passenger, the magnitude of the threshold of the beta wave and/or the theta wave which tend to increase under stress may be set to be relatively small.

In addition, when the ride comfort of the passenger is primarily determined as a state A using the objective information of the mobility and/or the passenger, the psychological state of the passenger may be determined using only a specific brain wave signal among the brain wave signals for each frequency band according to the state A.

For example, when the ride comfort of the passenger is primarily determined as a "posture preferable for driving" using the objective information of the mobility and/or the passenger, the psychological state of the passenger may be determined using only the alpha wave which mainly appears in the comfortable state.

As another example, when the ride comfort of the passenger is primarily determined as a "posture unpreferable for driving" using the objective information of the mobility and/or the passenger, the psychological state of the passenger may be determined using only the beta wave and/or the theta wave which tend to increase under stress.

The apparatus 700 for determining the ride comfort of embodiments of the present disclosure may control the mobility based on the second ride comfort information. In addition, the controller 730 may perform the above operation.

Here, the mobility may include a predetermined device in the mobility. For example, the predetermined device may include a seat, a steering wheel, a shift lever, a pedal, a mirror, a console box, a navigation device, a voice device, etc.

For example, when the second ride comfort information of the passenger is determined as a "posture unpreferable for driving", the angle and/or position of at least one of the seat of the passenger, the steering wheel, the shift lever, the pedal, the mirror or the console box may be controlled.

As another example, when the second ride comfort information of the passenger is determined as a "posture unpreferable for driving", the angle and/or position of the seat of the passenger may be displayed on the display device of the mobility. For example, when the position of the hip point is changed by seat aging using the hip-point as a reference point and the second ride comfort information as a "stress state", the current position of the seat and the position (e.g., the original hip-point position) of the seat to be adjusted (blow-up) may be displayed on the display device.

As another example, when the second ride comfort information of the passenger is determined as a "posture unpreferable for driving", the recommended seat angle and/or position of the passenger may be displayed on the display device of the mobility. The recommended seat angle and/or position may be the past position level of the passenger or the preset preferred seating posture of the passenger.

As another example, when the second ride comfort information of the passenger is determined as a "posture unpreferable for driving", the voice device of the mobility may provide a notice indicating that the current posture is not preferable for driving.

As another example, when the second ride comfort information of the passenger is determined as a "stress state", the hip-point of the passenger may be checked or the current posture of the passenger may be compared with the preset preferred seating posture of the passenger. In addition, information on the original hip-point position or the preferred seating posture of the passenger may be provided.

As another example, upon re-driving after driving is completed, the second ride comfort information determined during driving may be provided to the passenger. Alternatively, when the passenger rides in the mobility again after getting off the mobility, the second ride comfort information determined before getting off the mobility may be provided to the passenger.

FIG. 9 is a flowchart illustrating a method of operating an apparatus for determining the ride comfort of a user according to an embodiment of the present invention.

In step S901, the first ride comfort information of the passenger may be determined based on the information on the seating posture of at least one passenger in the mobility.

Here, the information on the seating posture of the passenger may mean a variety of information which may be used to determine the ride comfort of the passenger. In addition, the information on the seating posture of the passenger may mean objective factors affecting the ride comfort of the passenger.

In addition, the first ride comfort information of the passenger may mean objective evaluation information of the seating posture of the passenger. For example, this may mean ergonomic (or anatomical) evaluation information determined using the information on the passenger, the health status information, the seating information of the passenger and the driving environment information.

In step S902, the brain wave signals of the passenger in the mobility may be collected for a predetermined time.

Here, the brain wave signals may mean brain wave signals for each frequency band. For example, the brain wave signals may include alpha waves, beta waves and theta waves.

In step S903, the second ride comfort information obtained by correcting the first ride comfort information may be determined, by analyzing the collected brain wave signals based on the first ride comfort information.

Here, the second ride comfort information of the passenger may mean information obtained by correcting the first ride comfort information. That is, this may mean evaluation information obtained by reflecting the psychological state of the passenger in the objective evaluation information of the seating posture of the passenger.

Here, the analysis may include comparing the magnitude of the brain wave signal for each frequency band collected for the predetermined time with a predetermined threshold. In addition, the analysis may include extracting the brain wave signal for each frequency band.

For example, when the ride comfort of the passenger is primarily determined as a state A using the objective information of the mobility and/or the passenger, a predetermined weight is applicable to the predetermined threshold according to the state A.

In step S904, the mobility may be controlled based on the second ride comfort information.

Here, the mobility may include a predetermined device in the mobility. For example, the predetermined device may include a seat, a steering wheel, a shift lever, a pedal, a mirror, a console box, a navigation device, a voice device, etc.

For example, when the second ride comfort information of the passenger is determined as a "posture unpreferable for driving", the angle and/or position of at least one of the seat of the passenger, steering wheel, shift lever, pedal, mirror or console box may be controlled.

According to embodiments of the present invention, it is possible to provide an apparatus and method for determining the ride comfort of a mobility passenger based on the brain wave signal of the mobility passenger.

In addition, according to embodiments of the present invention, it is possible to provide an apparatus and method for controlling a mobility internal device related to a seating posture of a passenger based on a brain wave signal of the passenger in a mobility.

Although exemplary methods of embodiments of the present disclosure are described as a series of operation steps for clarity of the description, embodiments of the present disclosure are not limited to the sequence or order of the operation steps described above. The operation steps may be simultaneously performed, or may be performed sequentially but in different order. In order to implement the method of embodiments of the present disclosure, additional operation steps may be added and/or existing operation steps may be eliminated or substituted.

Various embodiments of the present disclosure are not presented to describe all of the available combinations but are presented to describe only representative combinations. Steps or elements in various embodiments may be separately used or may be used in combination.

In addition, various embodiments of the present disclosure may be embodied in the form of hardware, firmware, software, or a combination thereof. When an embodiment of the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of embodiments of the present disclosure includes software or machine-executable instructions (for example, operating systems (OS), applications, firmware, programs) that enable methods of various embodiments to be executed in an apparatus or on a computer, and a non-transitory computer-readable medium storing such software or machine-executable instructions so that the software or instructions can be executed in an apparatus or on a computer.

The description of embodiments of the disclosure is merely exemplary in nature and, thus, variations that do not depart from the substance of the disclosure are intended to be within the scope of the disclosure. Such variations are not to be regarded as a departure from the spirit and scope of the disclosure.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus for determining ride comfort of a passenger, the apparatus comprising:
    an analyzer configured to determine objective ride comfort information of a passenger based on objective information related to a seating posture of the passenger in a mobility;
    a sensor configured to collect brain wave signals related to a subjective psychological state of the passenger in the mobility for a predetermined time; and
    a controller configured to control the mobility,
    wherein the analyzer is configured to analyze the collected brain wave signals and determine adjusted ride comfort information by correcting the objective ride comfort information using the analyzed brain wave signals,
    wherein the controller is configured to control the mobility based on the adjusted ride comfort information, and
    wherein, when the objective ride comfort information of the passenger has a first value, the analyzer is configured to determine the adjusted ride comfort information using a predetermined brain wave signal among the brain wave signals.

2. The apparatus of claim 1, wherein the objective ride comfort information comprises at least one of personal information of the passenger, health status information of the passenger, seating information of the passenger, past posture information of the passenger, a preferred seating posture of the passenger or driving environment information.

3. The apparatus of claim 1, wherein the objective ride comfort information of the passenger comprises evaluation information of the seating posture of the passenger.

4. The apparatus of claim 1, wherein:
    the brain wave signals comprise a theta wave; and
    the analyzer is configured to determine that a state of the passenger is a stress state when a magnitude of the theta wave is greater than or equal to a predetermined threshold.

5. The apparatus of claim 1, wherein:
    the brain wave signals comprise an alpha wave; and
    the analyzer is configured to determine that a state of the passenger is a comfortable state when a magnitude of the alpha wave is greater than or equal to a predetermined threshold.

6. The apparatus of claim 1, wherein:
    the brain wave signals comprise a beta wave; and
    the analyzer is configured to determine that a state of the passenger is a stress state when a magnitude of the beta wave is greater than or equal to a predetermined threshold.

7. The apparatus of claim 1, wherein, when the objective ride comfort information of the passenger has the first value, the analyzer is configured to determine the adjusted ride comfort information using only the predetermined brain wave signal among the brain wave signals.

8. The apparatus of claim 1, wherein the mobility comprises at least one of a seat, a steering wheel, a mirror, a console box, a navigation device or a voice device.

9. The apparatus of claim 8, wherein, when the adjusted ride comfort information of the passenger is determined as a first state, the controller is configured to control an angle of at least one of the seat of the passenger, the steering wheel, the mirror or the console box.

10. The apparatus of claim 9, wherein, when the adjusted ride comfort information of the passenger is determined as a second state, the controller is configured to control a position of at least one of the seat of the passenger, the steering wheel, the mirror or the console box, wherein controlling the mobility when the adjusted ride comfort information is the second state is different that controlling the mobility when the adjusted ride comfort information is the first state.

11. A method of determining ride comfort of a passenger using brain wave signals, the method comprising:
    determining objective ride comfort information of a passenger based on objective information related to a seating posture of the passenger in a mobility;
    collecting brain wave signals relating to subjective psychological state of the passenger in the mobility for a predetermined time;
    analyzing the collected brain wave signals;
    determining adjusted ride comfort information obtained by correcting the objective ride comfort information using a predetermined brain wave signal among the brain wave signals when the objective ride comfort information of the passenger has a first value; and
    controlling the mobility based on the determined adjusted ride comfort information.

12. The method of claim 11, wherein the objective ride comfort information comprises at least one of personal information of the passenger, health status information of the passenger, seating information of the passenger, past posture information of the passenger, a preferred seating posture of the passenger or driving environment information.

13. The method of claim 11, wherein the objective ride comfort information of the passenger comprises evaluation information of the seating posture of the passenger.

14. The method of claim 11, wherein:
    the brain wave signals comprise a theta wave; and
    determining the adjusted ride comfort information comprises determining that a state of the passenger is a stress state when a magnitude of the theta wave is greater than or equal to a predetermined threshold.

15. The method of claim 11, wherein:
    the brain wave signals comprise an alpha wave; and determining the adjusted ride comfort information comprises determining that a state of the passenger is a comfortable state when a magnitude of the alpha wave is greater than or equal to a predetermined threshold.

16. The method of claim 11, wherein:

the brain wave signals comprise a beta wave; and determining the adjusted ride comfort information comprises determining that a state of the passenger is a stress state when a magnitude of the beta wave is greater than or equal to a predetermined threshold.

17. A method of determining ride comfort of a passenger using brain wave signals, the method comprising:

determining first ride comfort information of at least one passenger based on information on a seating posture of the passenger in a mobility;

collecting brain wave signals of the passenger in the mobility for a predetermined time;

determining second ride comfort information obtained by correcting the first ride comfort information, by analyzing the collected brain wave signals based on the first ride comfort information, wherein determining the second ride comfort information comprises determining the second ride comfort information using only a predetermined brain wave signal among the brain wave signals when the first ride comfort information of the passenger has a first value; and controlling the mobility based on the determined second ride comfort information.

18. The method of claim ii, wherein the mobility comprises at least one of a seat, a steering wheel, a mirror, a console box, a navigation device or a voice device.

19. The method of claim 18, wherein controlling the mobility comprises controlling an angle of at least one of the seat of the passenger, the steering wheel, the mirror or the console box when the adjusted ride comfort information of the passenger is determined as a first state.

20. The method of claim 19, wherein controlling the mobility comprises controlling a position of at least one of the seat of the passenger, the steering wheel, the mirror or the console box when the adjusted ride comfort information of the passenger is determined as a second state, wherein controlling the mobility when the adjusted ride comfort information is the second state is different that controlling the mobility when the adjusted ride comfort information is the first state.

* * * * *